US008042384B2

(12) United States Patent
Bailey

(10) Patent No.: US 8,042,384 B2
(45) Date of Patent: Oct. 25, 2011

(54) FUEL COMPOSITION ESTIMATION AND CONTROL OF FUEL INJECTION

(75) Inventor: Samuel G. Bailey, London (GB)

(73) Assignee: Delphi Technologies Holding S.arl, Troy, MI (US)

( * ) Notice: Subject to any disclaimer, the term of this patent is extended or adjusted under 35 U.S.C. 154(b) by 103 days.

(21) Appl. No.: 12/319,910

(22) Filed: Jan. 13, 2009

(65) Prior Publication Data
US 2009/0178474 A1   Jul. 16, 2009

(30) Foreign Application Priority Data

Jul. 13, 2006 (GB) .................................. 0613984.9
Jul. 13, 2007 (WO) ................. PCT/GB2007/002662

(51) Int. Cl.
*G01M 15/04* (2006.01)
(52) U.S. Cl. ..................................................... 73/114.38
(58) Field of Classification Search ............... 73/114.38, 73/114.45, 114.55
See application file for complete search history.

(56) References Cited

U.S. PATENT DOCUMENTS

| | | | |
|---|---|---|---|
| 4,280,183 A * | 7/1981 | Santi ................................ 702/24 |
| 5,367,999 A * | 11/1994 | King et al. ..................... 123/458 |
| 5,596,879 A * | 1/1997 | Burkhart et al. ................. 62/296 |
| 5,697,346 A | 12/1997 | Beck |
| 5,902,346 A | 5/1999 | Cullen et al. |
| 6,109,244 A | 8/2000 | Yamamoto et al. |
| 6,314,944 B1 * | 11/2001 | Majima .......................... 123/491 |
| 6,446,487 B1 * | 9/2002 | Van Wesenbeeck et al. .. 73/23.2 |
| 6,474,308 B2 * | 11/2002 | Okumura et al. ............. 123/491 |
| 6,872,071 B1 * | 3/2005 | Durst ............................... 431/90 |
| 7,028,532 B2 * | 4/2006 | Shinzawa ..................... 73/35.02 |
| 7,110,875 B2 * | 9/2006 | Fritsch et al. ................. 701/104 |
| 7,195,002 B2 * | 3/2007 | Tsutsui ......................... 123/467 |

(Continued)

FOREIGN PATENT DOCUMENTS

EP              0 828 070           3/1998

(Continued)

OTHER PUBLICATIONS

International Search Report dated Oct. 9, 2007.

(Continued)

*Primary Examiner* — Freddie Kirkland, III
(74) *Attorney, Agent, or Firm* — Thomas N. Twomey

(57) ABSTRACT

A method for estimating the composition of a fuel within an engine, comprises performing the following steps under ambient conditions: (a') determining the ambient temperature of the fuel; (a) monitoring the fuel pressure inside a fuel rail of the engine over a period of time; (b) calculating at least one frequency component of the change in fuel pressure; (c) calculating the speed of sound transmission c on the basis of the at least one frequency component; and (d) estimating the composition of the fuel on the basis of the calculated speed of sound transmission at said ambient temperature. Suitably, the speed of sound transmission in the fuel is calculated using the equation: $c = f\lambda$, where the wavelength $\lambda$ of the standing wave with frequency f is 2L, where L is the length of the fuel rail. Also described are methods for estimating the temperature of the fuel at a non-ambient temperature, and determining a fuels physical properties. Methods for controlling a fuel injection system in an engine according to the determined physical properties of the fuel and the resultant fuel injection system are also described.

20 Claims, 5 Drawing Sheets

U.S. PATENT DOCUMENTS

| | | | |
|---|---|---|---|
| 7,209,826 B2 * | 4/2007 | Abe et al. | 701/109 |
| 7,305,939 B2 * | 12/2007 | Carlson | 123/27 GE |
| 7,516,652 B2 | 4/2009 | Schulz et al. | |
| 7,752,885 B2 * | 7/2010 | Huang | 73/23.2 |
| 2005/0049777 A1 | 3/2005 | Fritsch et al. | |
| 2006/0130812 A1 * | 6/2006 | Tsutsui | 123/446 |
| 2006/0236976 A1 * | 10/2006 | Carlson | 123/406.47 |

FOREIGN PATENT DOCUMENTS

| | | |
|---|---|---|
| JP | 2006-153016 | 6/2006 |
| WO | 2005/021952 | 3/2005 |

OTHER PUBLICATIONS

Japan Office Action dated Feb. 21, 2011.

* cited by examiner

FUEL COMPOSITION ESTIMATION AND CONTROL OF FUEL INJECTION

CROSS-REFERENCE TO RELATED APPLICATIONS

This patent application is a nation stage patent application of International Patent Application No. PCT/GB2007/002662 filed on Jul. 13, 2007 and claims priority to Great Britain Provisional Patent Application No. 0613984.9 filed on Jul. 13, 2006.

FIELD OF THE INVENTION

This invention relates to methods for estimating the composition of fuel in an engine to determine its physical properties, and also to methods for controlling a fuel injection system in response to the physical properties of the fuel. In particular the invention relates to methods and fuel injection systems wherein fuel pressure, temperature and speed of sound transmission are used to estimate fuel parameters and adjust fuel injection timing accordingly.

BACKGROUND OF THE INVENTION

In a fuel injection system for a diesel-powered engine, fuel at high pressure is injected rapidly, and usually directly, into the fuel combustion chamber. Inside the combustion chamber the fuel mixes with air and combusts with the available oxygen to generate the power that is used to drive the vehicle.

One of the advantages of current fuel injection systems is that the amount of fuel entering the combustion chamber can be precisely controlled so as to improve the performance and emissions of the engine. For instance, better emissions can be achieved by matching the amount of fuel entering the combustion chamber in response to a signal indicating the amount of air flowing in to the engine.

In order to optimise the emissions performance of an engine (e.g. minimise $NO_x$ and particulates), extensive calibration and testing is performed on an engine, typically during engine development, under controlled conditions (for example, known fuel composition and fuel temperature). Hence, information such as: the optimum amount of fuel required to match a certain volume of air from a turbo charger, or to control the temperature of an after-treatment system such as a diesel particulate filter (DPF), is typically found by experimentation and programmed into an engine management computer or engine control unit (ECU).

However, it is known that the physical properties of a fuel (e.g. the viscosity, isoentropic bulk modulus and density) can vary quite considerably according to factors such as temperature and fuel composition. These properties in turn affect how the fuel behaves in a fuel injection system: for example, how quickly it flows; what its pressure is; and consequently, how much fuel is injected at each fuel injection event (stroke). This variation can be particularly significant for diesel engines (as opposed to gasoline engines), because diesel engines can often run on a relatively wide variety of fuel compositions, including biodiesels and biodiesel blends. By way of example, it is not uncommon for commercially available diesel fuel to have different compositions in winter and summer for optimal performance in different extremes of ambient temperature.

Biodiesel is considered to be an environmentally friendly alternative to traditional fuels such as diesel. It is derived from renewable resources such as vegetable and animal fats and waste cooking greases, and importantly, it can be mixed with petroleum-based diesel to create a blend, without causing damage to a diesel engine. Due to its wide variety of possible compositions, biodiesel can cause changes in engine performance and emissions. For example, Tat, M. E. & Van Gerpen, J. H. (ASAE paper no. 026084, ASAE Annual International Meeting, USA, Jul. 28-31, 2002) reported an approximately linear correlation between the biodiesel blend composition (i.e. the proportion of biodiesel and diesel in a blend) and the physical properties of density, isoentropic bulk modulus and the speed of sound transmission within the fuel.

Variations in the physical properties of a fuel can significantly impact on the actual amount of fuel that is injected into a combustion chamber in a single fuel injection event. When it is then considered that there could be over 70 injection events into the engine every second, the actual amount of fuel injected in any period of time could be considerably higher or lower than the actual fuel demand. Such a difference between fuel supply and demand can cause an engine to operate considerably differently to when it was first calibrated, with a consequential reduction in engine performance, perhaps in terms of one or more of power output, fuel economy and engine emissions.

Prior art fuel injection systems have fuel temperature sensors that use a thermocouple to measure fuel temperature. However these are both an additional expense and a potential point of failure. Moreover, such temperature sensors only measure the temperature in the vicinity of the sensor, and not across the bulk of the body of fuel. Composition sensors also exist that measure gasoline/ethanol blends (see Tat, M. E. and Van Gerpen, J. H. supra.). Again these are separate components, which introduce additional expense and potential point of failure issues.

Therefore, in order to accurately control a fuel injection system it would be advantageous to be able to mathematically model the behaviour of fuel under any set of conditions. For this reason, it would be beneficial for a fuel injection system to be able to estimate the composition of fuel within the engine/system and then compensate for its specific physical properties to optimise fuel injection events, for example, at engine start-up. Also it would be advantageous to estimate (or calculate) the temperature of fuel within the engine/system and then compensate for any changes in the physical properties of the fuel as the temperature of the fuel changes during engine use, i.e. under non-ambient conditions. Advantageously, the methods of the system operate without the need for additional temperature/composition sensors: for example, by using existing pressure sensors.

Accordingly, there is a need for a method of estimating the physical properties of fuel in an engine in real time, and under both ambient and non-ambient (i.e. operating) conditions. In addition, there is a need for an improved fuel injection system that is capable of responding to changes in fuel physical properties, engine conditions and/or fuel composition so as to accurately satisfy a specific (or change in) fuel demand under operating conditions.

This invention aims to overcome or alleviate some of the problems associated with the prior art.

SUMMARY OF THE INVENTION

Thus, in accordance with a first aspect of the invention, there is provided a method for estimating the composition of a fuel within an engine, comprising performing the following steps under ambient conditions: (a') determining the ambient temperature of the fuel; (a) monitoring the fuel pressure inside a fuel rail of the engine over a period of time; (b) calculating at least one frequency component of the change in fuel pressure; (c) calculating the speed of sound transmission c on the basis of the at least one frequency component; and (d) estimating the composition of the fuel on the basis of the calculated speed of sound transmission at said ambient temperature.

Suitably, the step of determining the ambient temperature of the fuel involves one or more of: measuring the ambient temperature of the atmosphere, measuring the ambient temperature of the engine, and measuring the ambient temperature of the fuel directly.

Typically, the step of monitoring the fuel pressure inside the fuel rail of the engine over a period of time is performed by providing an arrangement for repeatedly measuring the fuel pressure inside a fuel rail in an engine; for example, using a pressure sensor. Advantageously, in any of the aspects of the invention, the pressure sensor is located at, or approximately at, one end of the fuel rail, and most suitably it is located at the hydraulic end of the fuel rail. In the methods of the invention, the period of time over which the fuel pressure is monitored/measured is, beneficially, relatively short compared to the length of time over which the engine is operated, so that the operation of the engine does not cause the temperature of the fuel to change significantly during that period of time. Thus, the step of monitoring the fuel pressure in step (a) is advantageously less than 2 seconds, such as approximately 1 second.

Suitably, in step (b) the frequency of the standing wave f in the fuel is calculated from the change in fuel pressure of the fuel within the fuel rail. Advantageously, this calculation is carried out using fast fourier transform (FFT) analysis.

Beneficially, in step (c), the speed of sound transmission c in the fuel is calculated using the equation: $c=f\lambda$; wherein the wavelength $\lambda$ of the standing wave with frequency f is 2L, where L is the length of the fuel rail.

The estimating step carried out in step (d) may, according to suitable embodiments of the invention, be based on a means of data comparison, the data relating to the ambient temperature of the fuel, the calculated speed of sound transmission, and the mean fuel pressure inside the fuel rail. Such means of data comparison may suitably comprise one or more calibration curve, look-up table, data map, mathematical equation or other system for storing and processing data digitally.

So as to obtain information on the fuel under ambient temperatures, in this aspect of the invention, the method is advantageously carried out at engine start-up; i.e. before the working of the engine has caused the engine and fuel inside to heat up to above the ambient temperature.

In some embodiments of the invention, the method further comprises the steps of: (e) carrying out step (a) to (c) under non-ambient conditions; and (f) estimating the temperature of the fuel under the non-ambient conditions on the basis of the fuel composition estimated in step (d) under ambient conditions, and the speed of sound transmission calculated in step (e) under the non-ambient conditions.

Suitably, the estimating in step (f) is based on a means of data comparison, the data relating to fuel composition, fuel pressure and speed of sound transmission in the fuel at the non-ambient temperature.

In some embodiments of the invention, the method of the invention further comprises estimating at least one physical property of the fuel at said ambient temperature and/or said non-ambient temperature on the basis of the temperature and composition of the fuel. The at least one physical property of the fuel suitably includes one or more of density, viscosity and isoentropic bulk modulus.

In a second aspect there is provided a method for controlling a fuel injection system in an engine at engine start-up, comprising the steps of: (i) performing the steps of any of the methods of the invention to estimate the composition of the fuel within the engine; (ii) determining at least one physical property of the fuel at ambient temperature; and (iii) calibrating the start and end times of a fuel injection event controlled by the fuel injection system such that a predetermined mass of fuel is injected in the fuel injection event at ambient temperature.

In a third aspect the invention provides a method for controlling a fuel injection system in an engine, comprising the steps of: (i) performing the steps of any of the methods of the invention to estimate the non-ambient temperature of the fuel within the engine under non-ambient conditions; (ii) determining at least one physical property of the fuel at the non-ambient temperature; and (iii) calibrating the start and end times of a fuel injection event controlled by the fuel injection system such that a predetermined mass of fuel is injected in the fuel injection event at said non-ambient temperature.

In some embodiments of the invention, the non-ambient temperature of the fuel within the engine may be measured or estimated using a temperature sensor; for example, a temperature sensor known in the art. Suitably, such a temperature sensor is arranged to measure the temperature of the fuel within a fuel rail of the engine.

In the second and third aspects of the invention in step (ii) the at least one physical property of the fuel may comprise one or more of density, viscosity and isoentropic bulk modulus.

The methods of the invention are particularly suitable when the fuel comprises a biodiesel, for example, the fuel may be a diesel-biodiesel blend.

In a fourth aspect of the invention there is provided a fuel injection control system for an engine having one or more engine cylinders, comprising: means for estimating the composition of the fuel within an engine at ambient conditions; means for estimating at least one physical property of the fuel under the ambient conditions on the basis of the estimated fuel composition; means for estimating the mass-flow rate of the fuel under the ambient conditions; and means for adjusting the start and end points of a fuel injection event controlled by the fuel injection system on the basis of the mass-flow rate of the fuel, such that a predetermined mass of fuel is injected into the one or more engine cylinders in said fuel injection event at start-up.

Suitably, the fuel injection control system of the invention further comprises: means for estimating the temperature of the fuel within an engine under non-ambient conditions; means for estimating at least one physical property of the fuel under the non-ambient conditions on the basis of the non-ambient temperature; means for estimating the mass-flow rate of the fuel under the non-ambient conditions; and means for adjusting the start and end points of a fuel injection event controlled by the fuel injection system on the basis of the mass-flow rate, such that a predetermined mass of fuel is injected into the one or more engine cylinders in said fuel injection event under non-ambient conditions.

Typically, in the fuel injection control systems of the invention, the means for estimating the composition of the fuel within an engine at ambient conditions is performed according to a method of invention. Likewise, the means for estimating the temperature of the fuel within an engine under non-ambient conditions is performed according to a suitable method of the invention.

In this aspect of the invention, the means for estimating at least one physical property of the fuel under the ambient and/or the non-ambient conditions suitably comprises a means of data comparison, the data relating to one or more of the following: fuel composition, fuel pressure, fuel temperature and speed of sound transmission. Beneficially, the means of data comparison includes one or more calibration curve, look-up table, data map, mathematical equation or other form of storing and processing data digitally.

The means for estimating the mass-flow rate of the fuel may suitably comprise a means of data comparison, the data relating to one or more physical property of the fuel. Such physical properties of the fuel advantageously include one or more of density, viscosity and isoentropic bulk modulus.

In some embodiments, the means for adjusting the start and end points of the fuel injection event responds according to the mass-flow rate of the fuel under the ambient and/or the non-ambient conditions.

DETAILED DESCRIPTION OF THE INVENTION

Figure 1:
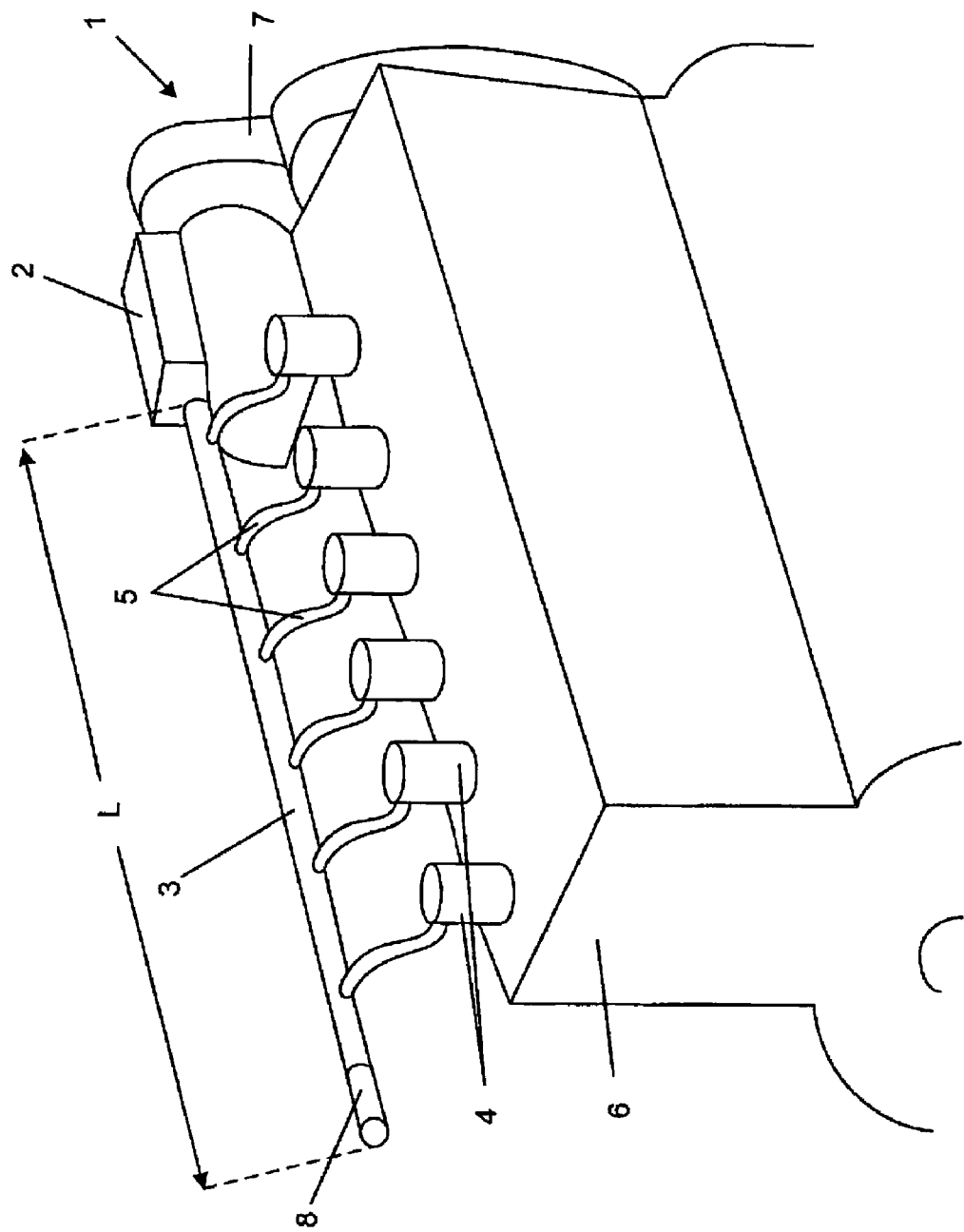
FIG. 1 is perspective view of a vehicle engine showing the position of a pressure sensor mounted in the pressurised fuel rail.

The physical properties of a substance, such as a liquid, are dependent on its composition and on its temperature. When an engine is active (i.e. running/operating) its components, including the fuel inside the engine, are heated by an amount that is dependent, inter alia, on the length of time during which the engine has been active and on the running conditions. Therefore, to determine the physical properties of a fuel within an engine, it is important to be able to actually determine (rather than merely predict) its composition and its temperature at any point in time.

In some cases, the composition of the fuel inside an engine will not be known. That is, irrespective of whether the user knows what fuel has been put into the engine, where an engine can operate using more than one fuel composition, it may be impossible to predict the exact composition of fuel inside the engine at any point in time.

Advantageously, however, the temperature of the fuel inside the engine can be readily determined at engine start-up and before the engine activity has caused significant heating of the engine and the fuel within the engine. Under these conditions, the fuel can be considered to be at ambient temperature. By "ambient" temperature it is meant the temperature of the fuel when it is not under the influence of factors other than the climate, i.e. the temperature of the natural environment. Thus, when the fuel temperature is subject to non-environmental means of cooling or heating the temperature can be considered to be "non-ambient". In other words, when an engine is operating it generates heat which may be then heat the fuel inside the engine. This heating effect causes the fuel to be at a non-ambient temperature. It can be assumed that during a period of prolonged engine inactivity (i.e. non-operation), the engine and the fuel within the engine are at or approximately at ambient conditions, and therefore, both the engine and the fuel are at ambient (i.e. atmospheric) temperature. Typically, after engine shut-off, the period of time taken for the fuel in an engine to return to ambient temperature following a period of engine activity during which the fuel was heated to non-ambient temperatures is at least as long as the period of time during which the engine was in use. Suitably, therefore, the fuel may be considered to return to ambient temperature at least 5 minutes after engine shut-off; at least 10 minutes after engine shut-off, or at least 15 minutes after engine shut-off. More suitably, the period of time required for the fuel to return to ambient temperature following engine activity is at least 30 minutes, or still more suitably at least 60 minutes following engine shut-off. However, it will be appreciated that the period of prolonged inactivity mentioned above need only be sufficiently long for the engine, or more importantly the fuel inside the engine, to return to approximately ambient temperature.

Thus, the invention advantageously provides a method of estimating the composition of a fuel within an engine under ambient conditions. In particular, there is provided a method for estimating the composition of a fuel within an engine, comprising performing the following steps under ambient conditions: (a') determining the ambient temperature of the fuel; (a) monitoring the fuel pressure inside a fuel rail of the engine over a period of time; (b) calculating at least one frequency component of the change in fuel pressure; (c) calculating the speed of sound transmission c on the basis of the at least one frequency component; and (d) estimating the composition of the fuel on the basis of the calculated speed of sound transmission at said ambient temperature.

It will be appreciated that the ambient temperature of the fuel inside the engine can be determined in a number of ways. Suitably, this step may involve one or more of: measuring the ambient temperature of the atmosphere, measuring the ambient temperature of the engine, and measuring the ambient temperature of the fuel directly. Conveniently, the ambient temperature may be determined using a temperature gauge positioned in a suitable location on a vehicle or in the engine. Many vehicles are already fitted with temperature gauges for monitoring atmospheric temperature and/or engine temperature. Although in some embodiments it may be possible to also measure fuel temperature directly, e.g. using temperature-sensing means such as a thermocouple or other transducer that is in direct contact with the fuel; suitably, the ambient temperature of the atmosphere and/or the ambient temperature of the engine may be measured and used as an estimate of fuel temperature. Such an estimate will be highly accurate provided the engine has been inactive for a reasonable period of time prior to the measurement being taken. Advantageously, ambient temperature is measured by a temperature gauge located in direct contact with a source of fuel in the engine (e.g. in the fuel tank or fuel rail). Most conveniently, the means of measuring the ambient fuel temperature in the methods of the invention is selected such that no significant changes in engine manufacturing procedures are required. Moreover, the use of an additional temperature sensor would create undesirable financial and reliability implications in the resultant engine design.

The ability to transmit sound is an important property of matter, and sound waves may be caused to propagate through the fuel within an engine by a number of events, such as the opening and closing of fuel valves, the operation of fuel pumps and fuel injectors, and by non-specific engine vibrations. The speed of sound transmission through a liquid is also dependent on the physical properties of the liquid. Thus, there is a relationship between the temperature of a liquid and the speed at which sound is transmitted through it. In other words, by calculating the speed of sound transmission in a liquid it may be possible to determine the temperature of the liquid at that point in time.

The speed of sound transmission in the fuel within the fuel rail can be calculated from the available data using any suitable formula that may be known to the skilled person in the art. Most suitably, the speed of sound c through a medium may be calculated using the equation:

$$c=f\lambda$$

where f is the frequency of the sound wave in the medium concerned, and $\lambda$ is the wavelength of the sound wave. Therefore, provided the frequency f and the wavelength $\lambda$ of a sound wave can be determined, the speed of sound can be readily obtained. Conveniently, the wavelength of the standing wave is 2L, where L is the length of the fuel rail.

The frequency f of a sound wave propagating through the fuel inside an engine can be determined by monitoring the change in pressure of that fuel over a period of time, and then by analysing the frequency components of the changing fuel pressure, as described further below.

The fuel pressure within an engine can be measured using any suitable means, for example, using a pressure sensor. The means for measuring the fuel pressure within an engine is conveniently mounted on or in the engine's fuel rail, so as to measure the fuel pressure inside the fuel rail. Typically, the fuel rail may be an elongate pipe rail ("rail length") or a spherical rail. However, it is preferred that the fuel rail in which fuel pressure is measured is a rail length, e.g. formed in an elongate pipe, rather than a spherical rail, because there is generally less wave activity inside a spherical rail. When the rail is a spherical rail, the pressure sensor is advantageously at the end opposite the fuel pump (where there is a fuel pump). More suitably, the means of measuring pressure is located within (for example, mounted on or in) the main body of the fuel rail. Beneficially, the fuel pressure is measured at or in the vicinity of an end of an elongate fuel rail; advantageously, at the hydraulic end of the fuel rail (e.g. the end furthest from the engine's fuel pump).

In a liquid fuel-powered engine, a pressure sensor will be fitted to the fuel rail of the engine as standard to enable closed loop control of the rail pressure, and to monitor for leaks in the fuel system. Therefore, to perform the methods of the present invention, it may not even be necessary to specially adapt a standard engine in order to monitor fuel pressure. Advantageously, the means for measuring fuel pressure in an engine is a pre-existing pressure sensor and the location of the pressure sensor is that of the existing sensor.

In these embodiments of the invention, it is advantageous that the necessary fuel pressure measurements are obtained relatively rapidly, so that the ambient fuel temperature (i.e. the temperature at engine start-up) is the same as the temperature of the fuel at the time when the speed of sound transmission is calculated. Beneficially, therefore, the methods of the present invention generate sufficient data to calculate speed of sound transmission over a short period of time, such that the fuel temperature does not increase (or at least does not significantly increase) over the period of time while the pressure data is collected (i.e. the measurement period).

Apart from the need to take pressure measurements over a short period of time to prevent a change in fuel temperature, other factors, such as the frequency of pressure measurements are advantageously taken into account. In this regard, sound waves (or shock waves) are propagated in the body of fuel inside an engine, such as inside the fuel rail, by inter alia valves opening and closing. The different opening and closing frequencies of the various valves adjoining the fuel rail mean that standing waves having different frequency components are set up.

To generate a record of the sound waves propagating within the body of fuel in the engine, and thereby determine the frequency of the sound waves, it is necessary to take pressure measurements at sufficiently high frequency. So that the wave information is not "aliased", the means for measuring pressure must be capable of taking pressure readings at more than twice the maximum expected frequency of the sound waves themselves. Preferably, the pressure sensor is capable of taking at least 2000 readings per second (2 KHz) for a 700 mm long rail. For a smaller rail, sampling frequencies up to 30 KHz may be required.

In order to "monitor" the fuel pressure, the pressure sensing means preferably repeatedly measures the fuel pressure (at the same point) over a period of time. Therefore, the above-described means for recording pressure should be capable of taking pressure measurements repeatedly, i.e. it is capable of taking discrete pressure readings at a certain frequency (or at a number of particular frequencies). Such a device can be considered to measure pressure repeatedly at a measurement frequency or "semi-continuously". Beneficially, the frequency at which pressure readings are taken is higher than twice the frequency of the sound waves. In an advantageous embodiment, the pressure-sensing device is capable of measuring pressure continuously. Further, the sensor may advantageously have a slew rate faster than the maximum amplitude of the pressure waves multiplied by the maximum frequency in radians/second. That is, the means of measuring pressure is capable of faithfully following any changes in pressure up to the frequency required.

Advantageously, the pressure measurements taken over the period of time concerned are recorded/stored for further analysis.

Due to the fact that the fuel pressure changes as a wave, a single pressure reading will not provide sufficient information to determine the wave components. Therefore, a series (i.e. a plurality) of discrete pressure readings are taken over a period of time, before the readings are then analysed to decipher the wave components. Thus, as already indicated, in addition to the frequency at which pressure measurements are taken, the period of time over which pressure readings are taken before the wave components are analysed can also be important. Suitably, the period of time over which pressure measurements are taken is longer than the time period of the appropriate sound wave. For example, the pressure measurements are preferably taken repeatedly (continuously or semi-continuously) over a period of time of at least 0.1 seconds. More preferably, the measurements are taken over a period of time of at least 0.25 seconds, at least 0.50 s or at least 0.75 s. In one embodiment, the period of time over which pressure measurements is taken is approximately 1.0 seconds. The period of time over which pressure measurements are taken before further data analysis may conveniently be referred to as the "measurement period".

During the pressure measurement period, it is sufficient to monitor either: (i) the actual pressure of the fuel at each point in time; or (ii) the change in pressure between each discrete pressure reading over that period of time. In each case, the readings will generate a wave comprising the same frequency components. However, in the case of (ii) above, the mean pressure may ultimately be used to estimate the fuel temperature and/or fuel composition (as discussed below). Therefore, the methods of the invention may also comprise the step of: providing means for repeatedly (i.e. continuously or semi-continuously depending on the frequency) measuring fuel pressure inside a fuel rail in an engine; and/or measuring the change in fuel pressure inside a fuel rail in an engine.

Advantageously in the methods of the invention, the actual pressure (rather than merely the change in pressure) is monitored.

After fuel pressure in the engine has been monitored (and/or recorded) over an appropriate period of time (the measurement period), the pressure data can be analysed to interpret the wave information and to calculate the frequency components of the data. This may reveal more than one frequency component, e.g. two or more frequency components. Typically, it has been found that inside the fuel rail of an active engine there are two main frequency components: a relatively low frequency component that reflects the frequency of fuel injection events; and a relatively high frequency component due to the standing wave (fundamental wave) of fuel inside the fuel rail. The frequency of the standing wave is considered to represent f, i.e. the frequency of sound waves transmitted through the fuel inside the fuel rail. Meanwhile, the wavelength of the standing wave in a body of fuel (e.g. the fuel within the fuel rail) is dependent on the length of the relevant body of fuel; i.e. the wavelength depends on the length of the pipework containing the fuel. Thus, where the method involves measuring the fuel pressure inside a fuel rail of length L, the wavelength of the standing wave is 2L. The length of the fuel rail in any particular engine can of course be readily determined. Hence, as already noted, referring to the equation $c=f\lambda$, the speed of sound transmission c in the fuel is equal to the frequency of the standing wave f multiplied by the wavelength 2L.

Where the pressure-measuring device produces an analogue rail pressure signal, beneficially the first step is to convert the pressure readings into a digital signal. Typically, an analogue to digital converter (or ADC) is used to generate a digital output for downstream processing e.g. using software.

The digital pressure data may be further analysed using suitable software. For example, software capable of performing a fast fourier transform (FFT) on the digitised pressure data is a suitable means by which the frequency components of the sound waves in the fuel can be determined. However, any other suitable means of analysis that are known to the person of skill in the art may alternatively be used. For example, one such alternative means for analysing the sampled pressure data is by discrete cosine transformation (DCT). In accordance with most advantageous embodiments, the pressure data is analysed by FFT.

Typically, following analysis of the pressure data by FFT, a series of data peaks will be produced with frequencies corresponding to the component frequencies of the sound waves. In such an FFT analysis, the measurements that display regular frequency components (e.g. periodicity) are reinforced to generate peaks in the FFT data at a position corresponding to the frequency of the original signal. Hence, the major component frequencies in the pressure data will generate an equivalent number of major peaks in the FFT data. Generally, the FFT data resolves more than one frequency component, for example, at least two major peaks are resolved, which correspond to: (1) the frequency of fuel injection events (which may be related to the engine speed); and (2) the frequency of the standing wave in the fuel (which is the wave passing back and forth within the chamber containing the relevant body of fuel). Further peaks in the FFT data may be caused by reflections in the standing wave, e.g. due to passages connecting to the relevant body of fuel.

Generally, the fuel injection-related waves are at a much lower frequency than the standing wave and, therefore, the components of the frequency data can be readily separated. For example, by removing (e.g. filtering) the fuel injection-related waves from the total FFT data (or other generated data as applicable), only the standing wave frequency data remains. The frequency f of the standing wave in the fuel within the engine corresponds to the frequency of sound waves transmitted through the fuel.

When resolving the frequency components of the pressure wave, the number of samples (i.e. pressure measurements) taken, n, and the frequency, F, at which those samples are taken, determines the maximum, minimum and the resolution of the frequencies that are detectable. In this regard, the maximum frequency resolvable is F/2; the minimum frequency detectable is F/n and the resolution is F/n. It is also worth considering, particularly where FFT analysis of the data is to be used, that the FFT algorithm runs most efficiently when the number of samples taken is $2^N$, where N is an integer (i.e. 1, 2, 3, 4, 5 etc.). Therefore, in an advantageous embodiment, the means for measuring pressure takes measurements at approximately 2 KHz for approximately 1 second to obtain sufficient pressure readings at a sufficient frequency to resolve the frequency characteristics of the sound wave in fuel. Preferably, pressure measurements are taken at 2 KHz for 1.024 seconds to gain 2048 samples (i.e. $2^{11}$). This number being selected because: (i) 2 KHz sampling frequency enables the sound waves to be resolved; (ii) the number of samples, $2^N$, allows efficient FFT analysis; and (iii) a measurement (sampling) period of approximately 1 s allows a rapid response to fuel temperature changes. In this system, the maximum wave frequency resolvable is approximately 2000/2, i.e. 1000 Hz, and the minimum frequency detectable and frequency resolution is 2000/2048, i.e. approximately 1 Hz.

Preferably, the sampling of pressure data is repeated within a short time period, e.g. 10 seconds (which may depend on the available computational power in the engine management computer), such that the update time of the temperature measurement (e.g. 10 s) is shorter than the time required for the fuel temperature to vary sufficiently that performance will be out of tolerance. More preferably, the update of fuel temperature would occur every 1.024 seconds, to increase the response time to temperature changes.

Therefore, measurement period is preferably less than 2.0 s, or less than 1.5 s, more preferably less than 1.25 s, and most preferably less than 1.1 s.

Taking the above preferred features into account, the measurement period is preferably between 0.5 and 2.0 s; between 0.75 and 1.5 s, between 1.0 and 1.25 s or between 1.0 and 1.1 s. More preferably, the measurement period is between 1.0 and 1.05 s or between 1.0 and 1.025 s. Most preferably, the measurement period is 1.024 s.

In accordance with the invention, the speed of sound transmission is used to determine the composition of fuel within the engine using a suitable means of data comparison. Suitably, the estimation of the fuel composition in step (d) is based on one or more calibration curves of fuel composition against speed of sound transmission therein at predetermined ambient temperatures. However, the speed of sound transmission though a liquid medium, such as engine fuel, may also depend on the pressure of the liquid. Therefore, the mean fuel pressure inside the fuel rail may also be calculated and used in conjunction with the speed of sound data and ambient fuel temperature. Mean fuel pressure can readily be determined, for example, by averaging the pressure measurements taken during the pressure measuring period.

Suitably, the composition of the unknown fuel is determined from the calculated value for the speed of sound transmission (or vice versa), using an appropriate means of data comparison; the data conveniently relating to ambient temperature and/or calculated speed of sound transmission and/or mean fuel pressure inside the fuel rail.

The means of data comparison may include any means of data comparison, such as graphs, tables, and particularly suitable means by which such data is stored and processed digitally (e.g. by way of a look up table, data map or mathematical equation that may be run by software), which provides a means of converting a speed of sound measurement into a fuel composition reading. Convenient forms of data comparison include one or more calibration curve, look-up table, data map, mathematical equation or other system for storing and processing data digitally. Suitably, the means of data comparison is a mathematical equation that provides, for example, a fuel composition reading measurement for an inputted speed of sound measurement at a certain temperature. Alternatively, a look up table (for example, a compensation table) or data map using a suitable interpolation technique may be used to relate speed of sound transmission to fuel composition.

Advantageously, the appropriate means of data comparison has been previously generated (for example, during engine development/testing) and, therefore, it may provide an immediate reference. More advantageously, the means of data comparison comprises a plurality of individual data comparisons, such as more than one calibration curve, mathematical equation, look up table or data map etc. In each case, these reference data sources have advantageously been previously generated. Most suitably, each of the plurality of individual data comparisons (e.g. a plurality of calibration curves) are generated for each of a plurality of different fuel compositions. By way of example, it may be beneficial to produce a series of (standard) calibration curves relating speed of sound transmission and temperature of fuel for a series of selected "ambient" temperatures. This is particularly preferred in cases where the fuel can be a biodiesel. Equally, it may be advantageous to have a number of calibration curves relating speed of sound transmission for a particular fuel composition to factors such as mean fuel pressure and/or other physical properties.

Fuel temperatures inside an engine may rise to 100° C. or above, particularly immediately after relaxing speed/load conditions following periods of prolonged hard engine activity. However, typically such a high fuel temperature will not be reached under ambient conditions, e.g. when the engine is not active, or at least, after a prolonged period of engine inactivity. Hence, the fuel temperatures selected for generation of the appropriate data comparison means (e.g. for standard/calibration curves) are advantageously potential ambient temperatures. Thus, the selection of temperatures for the one or more means of data comparison, such as calibration curves, beneficially depends on the likely ambient conditions to which the engine and fuel may be exposed. Potential ambient temperatures may be considered to be between −40 and 50° C., between −30 and 45° C., or between −20 and 40° C. More suitably, the ambient temperature is between −10 and 35° C., or between 0 and 30° C. Still more suitably, the ambient temperature is between 10 and 30° C. or between 15 and 25° C. Most preferably, the ambient temperature is 15, 16, 17, 18, 19, 20, 21, 22, 23, 24 or 25° C. The above potential temperature ranges may advantageously be used to generate standard data comparison means for providing a means of comparing the speed of sound and temperature of fuel to its composition. For example, for each fuel composition used for the generation of a means of data comparison, the speed of sound in the fuel may be measured at each potential "ambient" temperature, to provide a means of correlating a pair of data points, for example, speed of sound and temperature, to a specific composition of fuel. Thus, each means of data comparison is advantageously based on a plurality, e.g. 2 to 50, 3 to 30, 4 to 20 or 5 to 10 different fuel temperatures are selected and the corresponding speed of sound measurements are calculated. Conveniently, each standard calibration curve would be generated in e.g. 1° to 10° steps, such as 2°, 5° or 10° steps over the range of possible ambient temperatures, so that a suitable spread of data is produced. More suitably, the data comparison means is provided at 2° to 5° steps, 3° to 5° steps, or at intervals of 5°. In use, when the actual ambient temperature is in-between the temperatures used for calibration, interpolation of the data can be used to estimate the actual fuel composition and other relevant parameters.

The invention is related to the understanding that many engines, particularly diesel engines, can operate with a wide range of different fuel compositions, such as diesel-biodiesel blends. The environmentally friendly advantages associated with using diesel and biodiesel, however, may be lost due to losses in engine efficient and increased undesirable engine emissions that may result from changes in fuel composition when compared to the optimal engine fuel, for example, the fuel that may have been used during engine development and testing.

Biodiesel may have a particularly variable composition depending upon its source. For example, biodiesel can be derived from animal fats, vegetable oils, and waste grease products, such as discarded restaurant cooking oils. Therefore, as used herein, the term "biodiesel" does not refer to a specific type or source of biodiesel, and the term "diesel-biodiesel blend" (unless otherwise stated) refers to a mixture of petroleum-based diesel and biodiesel in any proportions.

It is known that a diesel engine can generally operate using different blends of biodiesel and diesel. For instance, a given diesel engine may be able to operate using 100% diesel fuel, or with diesel and biodiesel blends containing up to 100% biodiesel. Biodiesel can be blended with petroleum based diesel fuel in any proportions. Hence, a diesel-biodiesel blend may contain up to 5%, up to 10%, up to 15% or up to 20%, up to 30%, up to 40%, up to 50%, up to 60%, up to 70%, up to 80%, up to 90% or up to 100% biodiesel. Beneficially, therefore, data comparisons (e.g. standard/calibration curves) of temperature against speed of sound transmission are generated for more than one biodiesel blend, e.g. for more than one of the above percentage blends, to provide one or more means of data comparison. Preferably, such calibration curves are generated for 2, 3, 4, 5, 6, 7, 8, 9, 10 or more diesel-biodiesel blends, such as those compositions noted above. The selection of which blend compositions to use for purposes of calibration is advantageously dependent on the type of fuel that a particular engine is most likely to use, or on the likely available fuel sources. Therefore, where an engine performs optimally with a particular fuel blend/composition, the choice of fuels for calibration may be based around that optimal composition.

Advantageously, in accordance with the invention, a plurality of standard sets of data (e.g. calibration curves) are generated in which fuel temperature is correlated to speed of sound transmission for a range of diesels and/or biodiesels and/or diesel-biodiesel blends. Then, in use, when a particular ambient fuel temperature is measured and the speed of sound transmission is calculated, the composition of the fuel being used can be readily determined by reference to the standard data. Where the fuel used is not exactly the same composition as one of the "standard" fuels tested, the composition of the fuel can nevertheless be estimated by simple interpolation of the available data comparison means.

During periods of engine activity, both the engine and the fuel within the engine can be considered to be under non-ambient conditions and at non-ambient temperature. Under conditions of normal engine use, for example, in the use of a domestic vehicle, an engine fuel may conveniently be considered to have reached non-ambient temperatures after at least 2, 3 or 4 minutes of continuous engine use; suitably after at least 5 minutes of engine use; more suitably after at least 10 or 15 minutes of engine use; and most suitably after at least 30 minutes of engine use.

Furthermore, in use, the temperature of the fuel may not be the same as the temperature of the engine, and it is certainly not at atmospheric temperature. Therefore, a standard-fit temperature gauge for monitoring atmospheric (or even engine) temperature is not suitable for monitoring fuel temperature during engine operation. In these circumstances, the invention further provides a method for estimating the non-ambient temperature of the fuel.

Thus in one embodiment, the above-described methods of the invention further comprise the steps of: (e) carrying out steps (a) to (c) under non-ambient conditions; and (f) estimating the temperature of the fuel at the non-ambient conditions on the basis of the fuel composition estimated in step (d) and the speed of sound transmission (at non-ambient temperature) calculated in step (e) under non-ambient conditions.

Therefore, conveniently, the temperatures used for the generation of the means of data comparison discussed above are extended from the potential "ambient" temperatures already described to include potential "non-ambient" temperatures as well. In this regard, potential non-ambient temperatures may be in the range −40° C. to 350° C., such as 0° C. to 350° C., or 50° C. to 350° C. More suitably the non-ambient temperature range may be from 50° C. to 200° C., such as 50° C. to 150° C., or from 50° C. to 100° C. As before, standard data (e.g. calibration curves) may be produced by taking measurements of the speed of sound transmission in a particular composition of fuel at different temperatures within the suitable temperature intervals that correspond to the potential ambient and non-ambient temperature ranges. As already indicated, suitable temperature intervals may be selected from between 1° and 20°; for example, at intervals of 2°, 5° or 10° C.; and more suitably at intervals of 5° or 10° C., for example, up to a maximum temperature of 100° C., 150° C., 200° C., 250° C. or 350° C.

In this way, the temperature of the fuel within an engine under non-ambient conditions (i.e. during engine activity) may be determined using similar methodology to that already described above (for determining the composition of the fuel used), and using the knowledge of the composition of the fuel already determined. Once the non-ambient temperature of the fuel has been determined and having already estimated the composition of the fuel, it may then be possible to determine other physical parameters of the fuel at the calculated non-ambient temperature (such as viscosity, density and isoentropic bulk modulus), and use any of this information to control and/or adjust engine operation, such as a fuel injection event. The methods of the invention are particularly advantageous in that they may be used to determine the non-ambient temperature of the fuel immediately upstream of the fuel injectors, for example, in the fuel rail. Thus, any adjustments that may be necessary to a fuel injection event can beneficially be based on the temperature and other physical properties of the fuel that is in close proximity to the fuel injections Further advantageous features and improvements over the prior art may also be achieved by this and related embodiments of the invention. For example, in comparison to existing temperature sensing techniques, the invention enables the calculation of fuel temperature and the monitoring of temperature changes more quickly than many temperature measuring devices such as thermocouples and resistance thermometry devices, which typically react to temperature changes over periods of more than a second. In addition, the methods of the invention may provide a measurement of the temperature of the body of the fuel, not the body of the fuel rail (for example), which may respond at a different rate (e.g. more slowly) to fuel temperature changes.

However, in some embodiments, such as where suitable temperature sensors are available, a temperature sensor may alternatively be used to measure or estimate the temperature of the fuel in an engine under the non-ambient conditions. In such embodiments the temperature sensor may be any suitable temperature sensor known in the art and, conveniently, arranged to measure the temperature of the fuel directly, for example, the temperature sensor suitably contacts the fuel in a fuel rail of an engine.

Beneficially, the methods of the invention are capable of providing a rapid determination of the physical properties of the fuel, so that in use any change in fuel demand can be rapidly and accurately satisfied. This and other benefits may be achieved by use of a measurement period (i.e. the time period over which fuel pressure is measured before the frequency components are determined and the speed of sound is calculated) that is suitably short in relation to the period over which an engine is typically required to respond to a change in fuel demand. Thus, in certain embodiments of the invention, this allows any instantaneous change in fuel demand to be rapidly satisfied by appropriate adjustments in a system for controlling fuel injection events (as described elsewhere herein).

As the person of skill in the art will appreciate, the above-described embodiments of the invention may provide a method of determining the physical parameters (or properties) of fuel in use, even when the composition of the fuel was initially unknown.

The relevant physical properties of a liquid (such as engine fuel) that may change with temperature, include: density, viscosity, and isoentropic bulk modulus. These are non-limiting examples of the physical properties of a liquid, and other physical properties that are known to the person of skill in the art may also provide useful reference points for the performance of the invention. Hence, once the composition and the temperature of a fuel have been determined, it is then possible to determine relevant physical properties of the fuel at that temperature. Accordingly, embodiments of the invention may advantageously further comprise the step of estimating/determining at least one physical property of the fuel at the calculated non-ambient temperature; i.e. the operating temperature of the fuel. In accordance with a particularly suitable method of the invention, once the composition and temperature of the fuel in an engine has been determined, one or more of physical properties of the fuel, selected from density, viscosity and isoentropic bulk modulus is then estimated or determined.

As with the embodiments of the invention already discussed, the physical properties of the fuel at different temperatures are suitably determined by use of a means of data comparison; such as one or more calibration curve, look-up table, data map, mathematical equation or other system for storing and processing data digitally. Advantageously, the means of data comparison has been previously generated and may provide a means for converting a temperature reading for a particular (known, i.e. determined) fuel type, into an appropriate measurement of one or more fuel density, viscosity and isoentropic bulk modulus.

As the person skilled in the art will appreciate, the physical properties of a fuel affect its behaviour, and determine inter alia the amount of fuel that is able to pass through an injection valve in a specified period of time. For example, as fuel heats up, its density, viscosity and isoentropic bulk modulus tend to decrease. As the density of a liquid decreases, the mass of the liquid in a unit volume decreases. Therefore, the hotter the liquid, the less will be the mass of a particular volume of the liquid. However, as the viscosity of the liquid decreases, its flow rate through an opening, such as an injection valve, may increase, so that for a hotter liquid a greater volume can be injected in a specified time period. Accordingly, it may be necessary to consider more than one of the above-mentioned physical properties, so that the balance in the affects of changing density, viscosity and bulk modulus at particular fuel temperatures can be determined.

Having determined (or estimated) the physical properties of a fuel, it may be possible to mathematically model the probable behaviour of a fuel inside a working engine. This may then allow the creation of an engine control system that is adaptable to changes in the physical properties of a fuel as the conditions within an engine change. A beneficial engine control system is the fuel injection system of an engine, which is particularly sensitive to changes in the physical properties of a fuel; and the methods of the invention may, therefore, allow an accurate estimation (calculation) of the amount of fuel that will be injected in a single injection event under the determined non-ambient conditions.

Thus, in accordance with a second aspect of the invention, there is provided a method for controlling a fuel injection system in an engine at engine start-up, comprising the steps of: (i) performing the steps of the first aspect of the invention to estimate the composition of the fuel within the engine; (ii) determining at least one physical property of the fuel at ambient temperature; and (iii) calibrating the start and end times of a fuel injection event controlled by the fuel injection system such that a predetermined mass of fuel is injected in the fuel injection event at ambient temperature.

However, when an engine is in use, and has been for a period of time sufficient for the fuel to have reached a "non-ambient" temperature, there is provided a method for controlling a fuel injection system in an engine, comprising the steps of: (i) performing the steps of the invention to estimate the non-ambient temperature of the fuel within the engine under non-ambient conditions; (ii) determining at least one physical property of the fuel at the non-ambient temperature; and (iii) calibrating the start and end times of a fuel injection event controlled by the fuel injection system such that a predetermined mass of fuel is injected in the fuel injection event at said non-ambient temperature.

The start and end time points of a fuel injection event may also be measured in terms of the crankshaft angle in which case the start and end times of a fuel injection event may also be referred to as the "fuel angles".

It is important to note that prior art fuel injection systems are typically based on an assumption that, for a given fuel demand, a constant amount of fuel will be injected into a combustion chamber in each injection event. In any cases where this is not true, the engine requires a separate fuel temperature or composition sensor. The method of the present invention is an improvement over such prior art methods, because the length of each injection event can be adjusted, in real time, according to the physical properties of the fuel and the instantaneous fuel demand. In this way, the engine's fuel injection system is able to ensure that the required amount of fuel is injected into each combustion cylinder in each injection event.

The "amount" of fuel that is injected can be selected from either a volume or a mass of the fuel. Beneficially, the amount considered is the mass of fuel, such that a mass-flow rate through a fuel injector can be calculated under the non-ambient conditions. Mass-flow is a particularly suitable consideration because the corresponding mass of air required for the stoichiometric burning of the fuel can be more readily calculated. Beneficially, therefore, engine performance can be maximised and/or engine emissions can be reduced.

Any suitable means of data comparison, such as those already discussed above, can be used to convert the temperature measurement of a fuel into values for the physical properties of the fuel (see above), and then into mass-flow data. In other words, the estimated temperature of the fuel is used to amend/adjust the fuel mass-flow value, in order to accurately control the exact mass of fuel that is injected into a combustion chamber in a unit of time.

Advantageously, in step (iii) of the second and third aspects of the invention, the mass-flow data for the fuel is used to calculate appropriate start and end times of a fuel injection event so that a known amount of fuel is injected into a combustion chamber in each injection event. Thus, over any period of time, the method enables the required amount of fuel to be injected into a combustion chamber in order to accurately meet the fuel demand over that time period.

As the skilled person in the art will appreciate, the above-discussed means for estimating or determining the fuel composition, the non-ambient fuel temperature, and the physical properties of the fuel at that temperature apply to these aspects of the invention as they do to the first aspect and embodiments of the invention.

In addition to the methods of the invention, which may relate to means for controlling a fuel injection system to improve engine performance, in accordance with a fourth aspect of the invention there is provided a fuel injection control system for an engine having one or more engine cylinders, comprising: means for estimating the composition of the fuel within an engine at ambient conditions; means for estimating at least one physical property of the fuel under the ambient conditions on the basis of the estimated fuel composition; means for estimating the mass-flow rate of the fuel under the ambient conditions; and means for adjusting the start and end points of a fuel injection event controlled by the fuel injection system on the basis of the mass-flow rate of the fuel, such that a predetermined mass of fuel is injected into the one or more engine cylinders in said fuel injection event at start-up.

It will be understood, however, that where the composition of the fuel is already known, it may not be necessary for the fuel injection control system of the invention to either include or implement the means for estimating the composition of the fuel.

It will, of course, be understood that the means for estimating the composition of the fuel may advantageously operate according to the above discussed methods for determining the composition of a fuel: for example, this may comprise a means for determining an ambient fuel temperature; a means for calculating the speed of sound transmission through the fuel; and means for data comparison (such as a way of interrelating measurements of speed of sound transmission, temperature and fuel composition), as already described.

Said means for estimating the temperature of the fuel within an engine under non-ambient conditions is preferably performed according to any suitable methods of the invention previously described. In brief: (1) fuel pressure may be measured repeatedly inside the fuel rail of the engine; (2) the frequency components of the pressure may then be determined to calculate the frequency of the standing wave within the body of fuel, and the speed of sound may then be calculated; and finally (3) the speed of sound can be used to determine the non-ambient (or ambient) temperature of the fuel.

Said means for estimating the physical properties of the fuel at the calculated non-ambient temperature preferably comprises a means of data comparison, for example, selected from one or more calibration curves, look up tables, data maps, mathematical equations or other forms of storing and processing data e.g. digitally. In this way, the mass-flow rate of the fuel under the non-ambient conditions can also be readily obtained, e.g. also by way of data comparison/calibration curves, as discussed above.

Said means for adjusting the start and end points of fuel injection (e.g. the fuel angles) can involve the use of any means known to the person of skill in the art. For example, prior art fuel injection control systems may already include means for changing the fuel angles in response to different power demands. In addition, the methods and devices of the present invention may include the means for adjusting the fuel angles according to the mass-flow rate of the fuel at the particular non-ambient temperature of the fuel.

As indicated previously, rather than the fuel injection control system adjusting the start and end points of fuel injection according to the calculated mass-flow rate, the invention may alternatively, or also, include calculating the volume-flow rate of the fuel at any temperature, such as under non-ambient conditions.

The invention will now be described with reference to the figures.

Referring to FIG. 1, an engine 1 of the common-rail type, comprises a fuel pump 2, which is connected to a gear drive 7 and a pressurised fuel rail 3. In a common-rail engine, such as that depicted, the pressurised fuel rail 3 feeds fuel into a plurality of fuel injectors 4, via a corresponding plurality of connecting pipes 5. The fuel injectors 4 may be mounted in a row along the engine block 6, as depicted. A means for measuring the fuel pressure inside the fuel rail 3 of the engine 1 is provided in the form of a pressure sensor 8, which may be situated at the end of the fuel rail 3 furthest from the fuel pump 2 (i.e. at the hydraulic end of the fuel rail).

During operation, the gear drive 7 provides power to the fuel pump 2, which then delivers pressurised fuel into the fuel rail 3 and, subsequently, into the plurality of fuel injectors 4 via the short connecting pipes 5. The fuel injectors 4 inject fuel into the engine cylinders (not shown) inside the engine block 6, in which the fuel combusts to generate power for the engine 1.

To determine the fuel composition in the fuel rail 3 at ambient temperature (e.g. at engine start-up), or to determine the non-ambient fuel temperature inside the fuel rail 3, the speed of sound transmission through the fuel in the fuel rail 3 is estimated/calculated. First, the pressure sensor 8 repeatedly measures the pressure of the fuel inside the fuel rail 3. Typically, the recorded pressure measurements (or alternatively measurements of change in pressure) over time reveal more than one frequency component, such as a low frequency component due to the opening and closing of valves inside the engine (e.g. the fuel injectors 4), and a high frequency component due to the standing wave inside the fuel rail 3. The wavelength of the standing wave inside the fuel rail 3 is 2L, where L is the length of the fuel rail 3.

Figure 2:
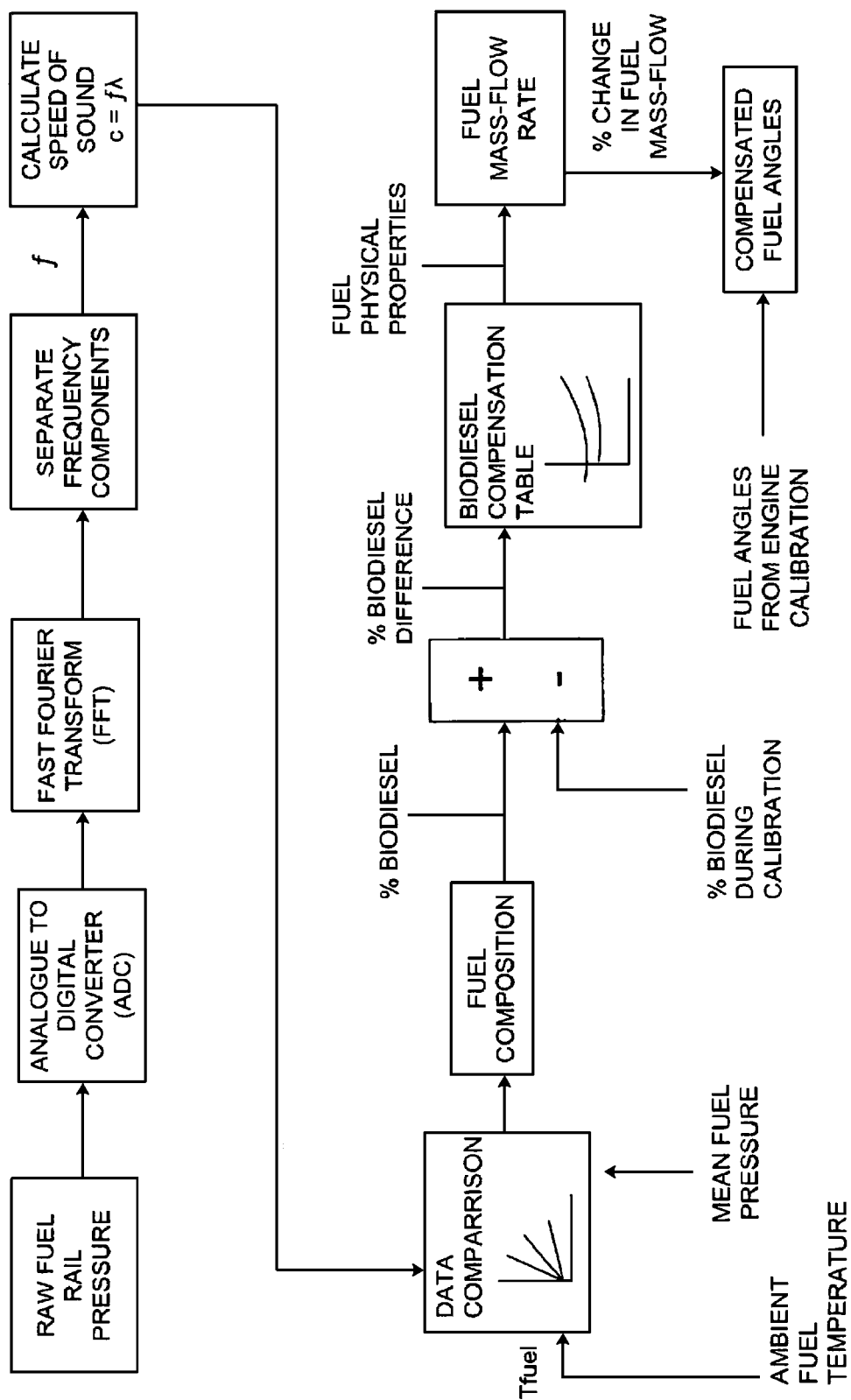
FIG. 2 is a flow diagram showing the steps involved in one embodiment of a fuel injection control system according to the invention.

FIG. 2 depicts how a fuel control system in accordance with the invention may operate to control and adjust/modify the start and end points of each fuel injection event (e.g. the crankshaft angle or "fuel angles") in an engine, by first determining the composition of fuel inside the fuel rail of an engine under ambient engine conditions (and ambient temperature), e.g. at engine start-up. This system is particularly appropriate in circumstances where the fuel composition is not known, for example, because an engine is charged with a different fuel to that previously used in the engine. Such a situation may typically occur in cases where diesel and/or biodiesel are used in an engine.

In the system exemplified, the fuel temperature is initially determined by measuring the ambient temperature of the fuel, e.g. at engine start up (step not shown), for example, by measuring the temperature of the atmosphere and/or the engine and/or the fuel inside the engine.

The next step is to measure the speed of sound transmission in the fuel under ambient conditions, i.e. before the fuel inside the engine has been heated by the operation of the engine. In the first step depicted, the raw rail pressure (i.e. the fuel pressure inside the fuel rail) is measured repeatedly. Discrete fuel pressure measurements must be taken with sufficient frequency and over a sufficiently long period (e.g. approximately 1 second), to allow the frequency components of the changing fuel pressure to be monitored. Thus, pressure readings must be taken at a higher frequency than the frequency of the sound waves in the fuel, and must be taken over a longer period of time than the time period of a sound wave.

If the pressure is read in analogue, then in the next step it is necessary to convert the analogue readings into a digital signal using an analogue to digital converter (ADC). The digital signal can then be processed using appropriate software as described below.

Next the digital pressure signal is processed to determine the frequency components of the change in fuel pressure. Any suitable means of data processing can be used, although conveniently, as depicted, fast fourier transform (FFT) analysis is used. The FFT analysis identifies the major frequency components of the change in fuel pressure, which allows, in the next step, the different frequency components to be separated. Typically, the highest frequency component represents the frequency of the standing (or fundamental) wave inside the fuel within the fuel rail of the engine. This frequency represents the frequency of sound waves in the fuel f.

Next the speed of sound transmission in the fuel is calculated. For example, the speed of sound can be calculated using the equation, $c=f\lambda$; wherein the wavelength of the standing wave with frequency f is 2L, where L is the length of the fuel rail.

Having determined the speed of sound transmission, the ambient fuel temperature and the mean fuel pressure, a means of data comparison may be used to determine the composition of the fuel and, for example, the biodiesel (blend) composition (% biodiesel) may be determined using a suitable means for data comparison and analysis (for example, one or more calibration curves, look-up tables, data maps, graphs and mathematical equations). The means of data comparison, such as calibration curves, conveniently concern the relationship between ambient temperature and the speed of sound transmitted in the fuel in relation to its composition. Suitably, the pressure of the fuel, particularly its mean pressure, may also be considered. The mean fuel pressure inside the fuel rail during the pressure measurement period may be considered to be the average fuel pressure over the time period during which the fuel pressure measurements are taken.

Having determined the fuel composition, the physical properties of the fuel can be determined by direct reference to appropriate means of data comparison, such as compensation tables (look-up tables, or calibration curves, for example). Alternatively, as depicted, the percentage difference between the calculated composition of the fuel in the engine and the fuel compositions used for engine calibration may be calculated, and this percentage difference may then be used to determine the approximate physical properties of the fuel. Physical properties that may be of interest include density, viscosity and bulk modulus.

In the next step, the fuel's physical properties are used to calculate the mass-flow rate of the fuel in the engine at the ambient temperature measured. The mass-flow data can then be used to recalculate appropriate fuel angles for use with that particular fuel.

In an alternative embodiment, the fuel injection control system may adjust the fuel angles so that a particular volume, rather than a particular mass, of fuel is injected in each fuel injection event.

It should also be noted that the system for determining fuel composition (e.g. % biodiesel), exemplified in FIG. 2 can readily be combined with the system exemplified in FIG. 3, below. In this way, a fuel injection control system of the invention can calculate appropriate fuel angles at engine start-up and also during periods of engine activity, when the fuel inside the engine is at non-ambient temperature.

Figure 3:
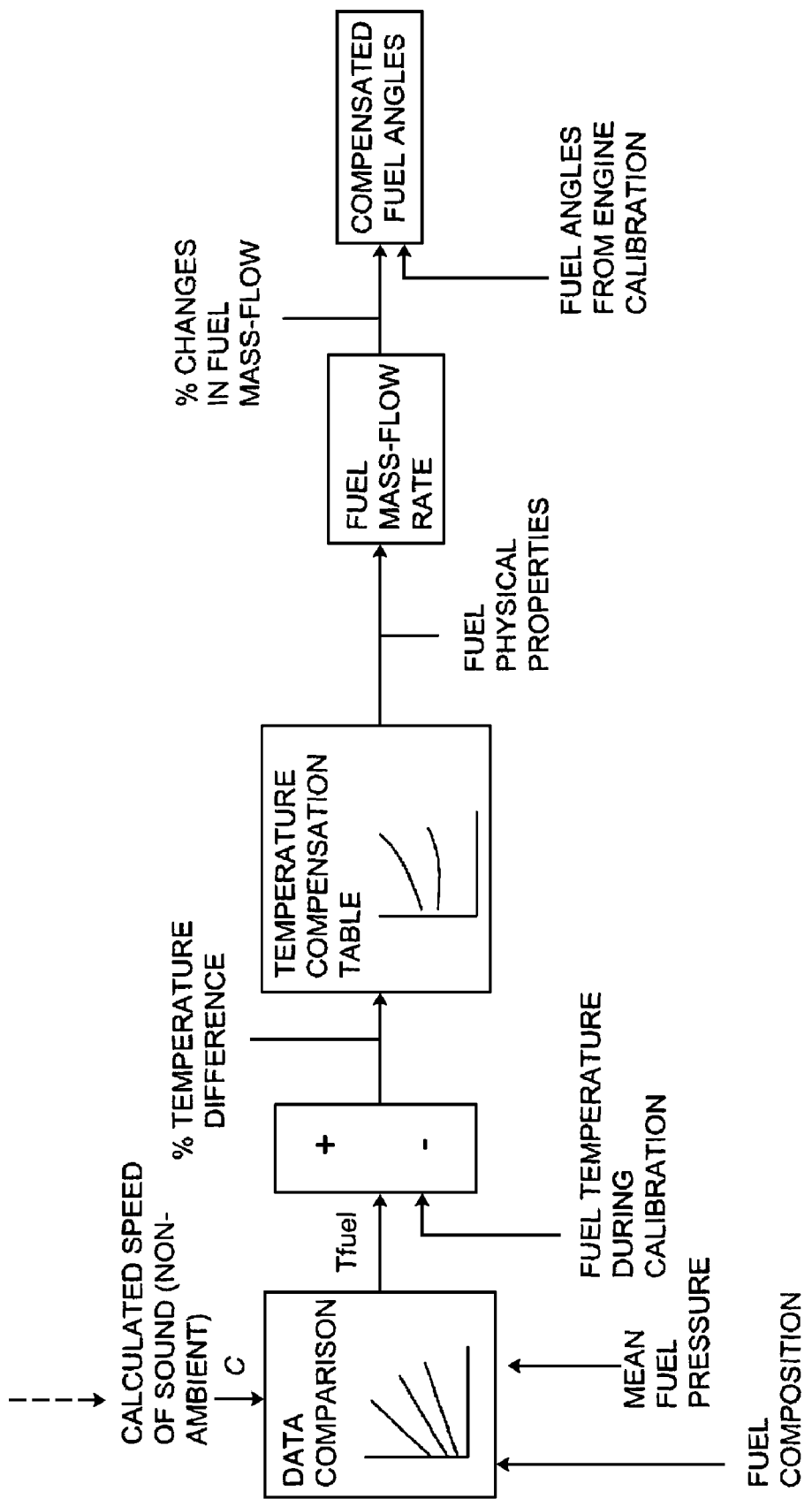
FIG. 3 is a flow diagram showing the steps of another embodiment of the fuel injection control system according to the invention.

Turning to FIG. 3, under non-ambient engine conditions, e.g. during periods of engine operation, a fuel control system according to the invention operates to control and adjust/modify the start and end points of each fuel injection event (e.g. the crankshaft angle or "fuel angles"), according to the changing physical parameters of the fuel as its temperature changes.

The process by which the speed of sound transmission in the fuel is measured may be the same as that depicted along the upper row of FIG. 2. Similarly, the mean pressure of the fuel can be determined in any suitable way.

As depicted, having regard to the fuel composition (calculated by the method of FIG. 2), the mean fuel pressure and the speed of sound transmission in the fuel; the fuel temperature ($T_{fuel}$) can be calculated using a suitable means of data comparison. Suitably, $T_{fuel}$ may be calculated by reference to one or more calibration curves, which inter-relate the physical parameters of e.g. pressure, speed of sound transmission and temperature for the fuel composition that has been determined. For example, advantageously, there may be a plurality of calibration curves for fuel temperature against speed of sound transmission, each of which is based on a different fuel compositions and/or mean fuel pressures. Alternatively, for instance, a calibration curve of fuel temperature against speed of sound transmission may be used in conjunction with a mathematical equation relating a change in fuel temperature to a change in speed of sound transmission at a particular fuel pressure.

Having thus determined the non-ambient temperature of the fuel, there are a number of ways in which the fuel's physical properties can then be determined. For instance, similar means of data comparison to those already mentioned above (i.e. one or more calibration curves) can be used to relate the known temperature of the fuel to individual physical properties. Alternatively, as depicted in FIG. 3, the calculated (or estimated) fuel temperature ($T_{fuel}$) can be compared to the fuel temperatures used during engine calibration, to give a percentage change in the fuel temperature. This percentage change in fuel temperature can then be used to determine the physical properties of the fuel under the non-ambient temperature using suitable means for data comparison, such as a compensation table (look-up table).

Once the physical properties of the fuel have been determined at the calculated temperature, the next step is to calculate the mass-flow rate of the fuel, as discussed having regard to FIG. 2.

Knowing the mass-flow rate of the fuel means that it is possible to model the behaviour of the fuel inside the engine. For example, the percentage change in the mass-flow rate of the fuel (i.e. the difference between the mass-flow rate at the relevant calculated temperature, $T_{fuel}$, and the mass-flow rate of the fuel during engine calibration) may conveniently be used to calculate appropriate start and end points/times for each fuel injection event. Thus, once the mass-flow rate at $T_{fuel}$ is known, the fuel angles can be adjusted so that the desired quantity (mass) of fuel is delivered to the engine cylinders in each fuel injection event. As already suggested, in the alternative, the volume-flow rate may be used for the calibration of appropriate fuel angles.

Figure 4:
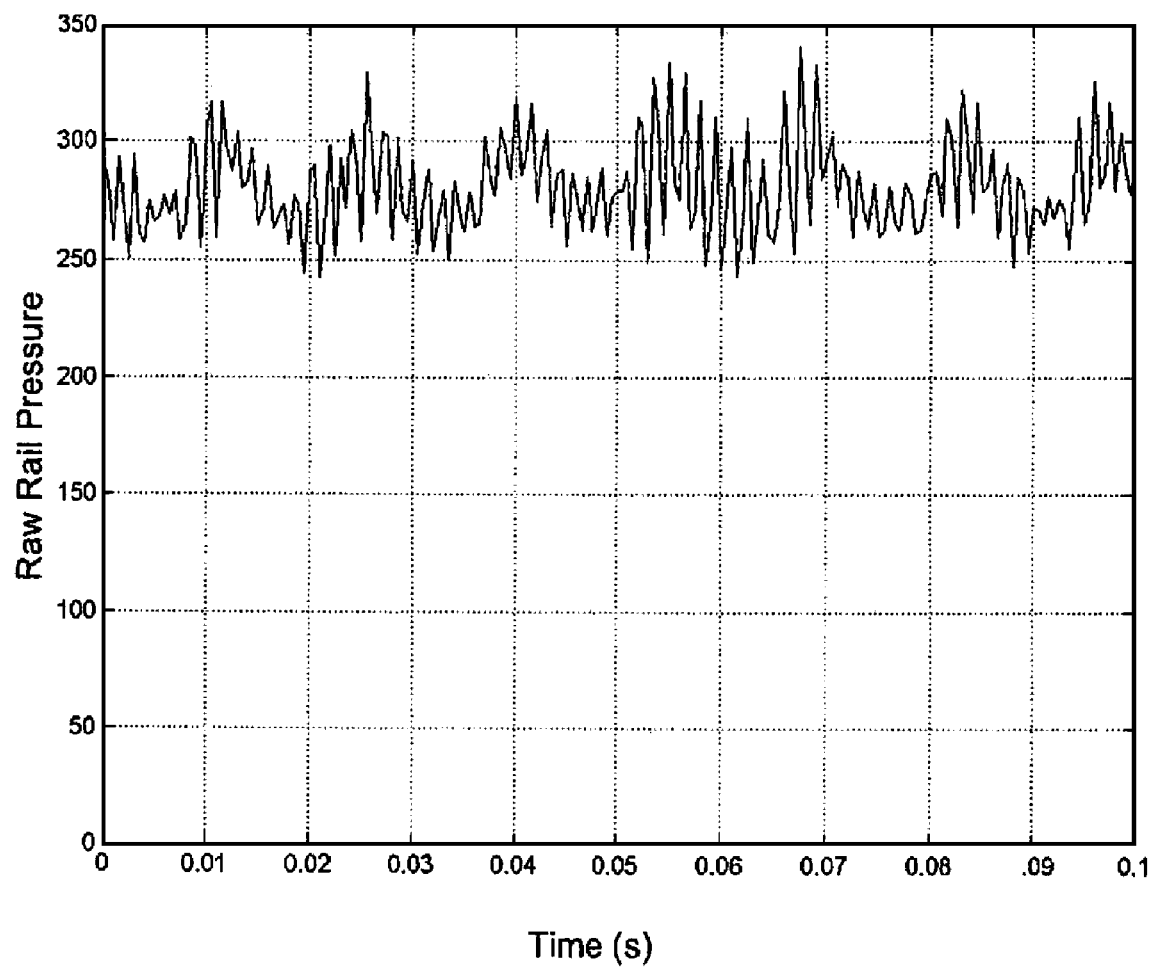
FIG. 4 is a graph of raw rail pressure measurements (fuel pressure inside the fuel rail of an engine) taken over a measurement period of 0.1 s.
Figure 5:
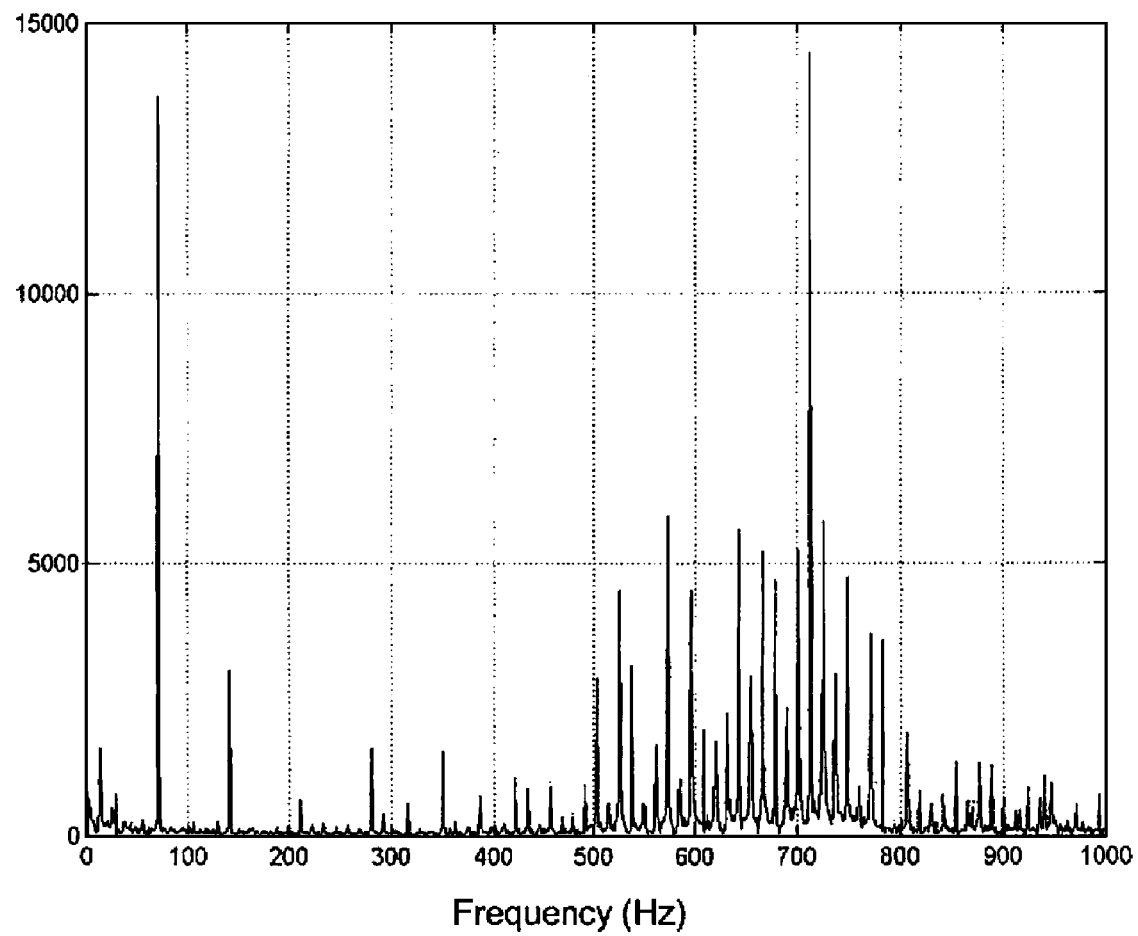
FIG. 5 shows a fast fourier transform (FFT) analysis of the fuel pressure data of FIG. 4.

FIGS. 4 and 5 show some of the data obtained when the non-ambient fuel temperature inside an operating engine is calculated in accordance with the invention.

FIG. 4 depicts the changes in fuel pressure inside the fuel rail of an engine.

Raw rail pressure was measured inside an engine using a pressure sensor arranged as depicted in FIG. 1. Rail pressure readings were taken on the engine during open loop steady state operation (i.e. fixed length fuel filling pulses). The engine was run at approximately 1400 rpm.

Having regard to FIG. 4, the fuel pressure inside the fuel rail can be seen to fluctuate by approximately ±60 bar. The mean fuel pressure recorded is approximately 280 bar.

The pressure measurements can generally be seen to include two frequency components: a high frequency component that produces the relatively pointed trace (approximately 7 peaks in each 0.01 s); and a lower frequency component that produces a more undulating profile (approximately 2 peaks in 0.03 s).

The general pattern of the fuel pressure measurements shown in FIG. 4 is confirmed by plotting the pressure data in the frequency domain using an FFT analysis, as shown in FIG. 5.

FFT analysis of the data in FIG. 4 (see FIG. 5) produces a series of peaks at corresponding frequencies to the frequency components present in the pressure readings. The amplitude of the FFT peaks is related to the regularity of the frequency components. Therefore, the main frequency components in the fuel pressure data produce the largest peaks in the FFT trace.

Accordingly, it can be seen that there are two main frequency components in the fuel pressure measurements: a relatively low frequency component at approximately 70 Hz, which corresponds to the undulating wave described in regard to FIG. 4; and a relatively high frequency component at approximately 713 Hz, which corresponds to the high frequency component described with respect to FIG. 4.

It is thought that the lower frequency component of the pressure fluctuations is caused by the opening and closing of injector valves inside the engine's fuel injection equipment. At 1400 rpm, the injection valves operate at approximately 70 Hz, which corresponds to the lower frequency component of the pressure data.

The high frequency component at 713 Hz is caused by the standing wave (or fundamental wave) in the fuel within the fuel rail of the engine. In the example shown, the length of the fuel rail is 0.93 m. Hence, the standing wave has a wavelength of 1.86 m.

The speed of sound can therefore be calculated, for example, using the equation, $c=f\lambda$. In this case, for a resonant frequency of 713 Hz, the speed of sound c is approximately 1330 m/s.

Taking into account the mean fuel pressure of 280 bar, and referring to appropriate tables of the fuel's physical properties, the temperature of the fuel is calculated to be approximately 65° C. This calculation of fuel temperature is within ±3° C. of the directly measured fuel temperature.

The tolerance in the fuel temperature calculation of ±3° C. corresponds to ±4 m/s in the speed of sound measurement and ±2 Hz in the frequency measurement.

Although the engine of the example was operated in open loop and steady state, this is not necessary for the operation of the invention. For instance, in closed loop or transient behaviour the low frequency component of the fuel pressure measurements may be affected due to changes in the timing of valve opening events, but the standing wave in the fuel (i.e. the high frequency component) will not be affected.

Without wishing to be bound by theory, it is thought that the additional FFT peaks at around 713 Hz are due to reflections from the different path lengths arising from the short interconnecting pipes between the fuel rail and the injectors.

The invention claimed is:

1. A method for estimating a composition of a fuel within an engine, comprising performing the following steps under ambient conditions:
   (a') determining an ambient temperature of the fuel;
   (a) monitoring a fuel pressure inside a fuel rail of the engine over a period of time;
   (b) calculating at least one frequency component of the change in fuel pressure;
   (c) calculating a speed of sound transmission c on the basis of the at least one frequency component; and
   (d) estimating the composition of the fuel on the basis of the calculated speed of sound transmission at said ambient temperature
   wherein the fuel comprises a biodiesel.

2. The method of claim 1, wherein in step (a'), said determining the ambient temperature of the fuel involves one or more of: measuring an ambient temperature of the atmosphere, measuring an ambient temperature of the engine, and measuring the ambient temperature of the fuel directly.

3. The method of claim 1, wherein in step (b) the frequency of the standing wave f in the fuel is calculated from the change in fuel pressure.

4. The method of claim 1, wherein in step (c), the speed of sound transmission c in the fuel is calculated using the equation:

$$c=f\lambda;$$

wherein the wavelength $\lambda$ of the standing wave with frequency f is 2L, where L is the length of the fuel rail.

5. The method of claim 1, wherein said estimating in step (d) is based on a means of data comparison, the data relating to the ambient temperature of the fuel, the calculated speed of sound transmission, and a mean fuel pressure inside the fuel rail; wherein said means of data comparison optionally includes one or more calibration curve, look-up table, data map, mathematical equation or other system for storing and processing data digitally.

6. The method of claim 1, which is carried out at engine start-up.

7. The method of claim 1, wherein in step (a) said period of time is less than 2 seconds.

8. The method of claim 1, which comprises, under non-ambient conditions, measuring or estimating the temperature of the fuel using a temperature sensor to determine a non-ambient temperature of the fuel.

9. The method of claim 1, which further comprises the steps of:
   (e) carrying out steps (a) to (c) under non-ambient conditions; and
   (f) estimating a non-ambient temperature of the fuel under the non-ambient conditions on the basis of the fuel composition estimated in step (d) and the speed of sound transmission calculated in step (e).

10. The method of claim 9, wherein the estimating in step (f) is based on a means of data comparison, the data relating to fuel composition, fuel pressure and speed of sound transmission in the fuel at the non-ambient temperature.

11. The method of claim 9, which further comprises estimating at least one physical property of the fuel at said ambient temperature and/or said non-ambient temperature on the basis of the temperature and composition of the fuel.

12. A method for controlling a fuel injection system in an engine, comprising the steps of:
   (i) forming the steps of claim 9 to estimate the non-ambient temperature of the fuel within the engine under non-ambient conditions;
   (ii) determining at least one physical property of the fuel at the non-ambient temperature; and
   (iii) calibrating the start and end times of a fuel injection event controlled by the fuel injection system such that a predetermined mass of fuel is injected in the fuel injection event.

13. The method of claim 12, wherein in step (ii) the at least one physical property of the fuel includes one or more of density, viscosity and isoentropic bulk modulus.

14. A method for controlling a fuel injection system in an engine at engine start-up, comprising the steps of:
   (i) forming the steps of claim 1 to estimate the composition of the fuel within the engine;
   (ii) determining at least one physical property of the fuel at ambient temperature; and
   (iii) calibrating the start and end times of a fuel injection event controlled by the fuel injection system such that a predetermined mass of fuel is injected in the fuel injection event.

15. The method of claim 1, wherein in step (a'), said determining the ambient temperature of the fuel involves one of measuring an ambient temperature of the atmosphere and measuring an ambient temperature of the engine.

16. A method for estimating a composition of a fuel within an engine, comprising performing the following steps under ambient conditions:
   (a') determining an ambient temperature of the fuel;
   (a) monitoring a fuel pressure inside a fuel rail of the engine over a period of time;
   (b) calculating at least one frequency component of the change in fuel pressure;
   (c) calculating a speed of sound transmission c on the basis of the at least one frequency component; and
   (d) estimating the composition of the fuel on the basis of the calculated speed of sound transmission at said ambient temperature.

17. A fuel injection control system for an engine having one or more engine cylinders, comprising:
   means for estimating a composition of the fuel within an engine at ambient conditions;
   means for estimating at least one physical property of the fuel under the ambient conditions on the basis of the estimated fuel composition;

means for estimating mass-flow rate of the fuel under the ambient conditions; and means for adjusting the start and end points of a fuel injection event controlled by the fuel injection system on the basis of the mass-flow rate of the fuel, such that a predetermined mass of fuel is injected into the one or more engine cylinders in said fuel injection event at start-up;

and optionally which further comprises:

means for estimating a temperature of the fuel within an engine under non-ambient conditions;

means for estimating at least one physical property of the fuel under the non-ambient conditions on the basis of the non-ambient temperature;

means for estimating mass-flow rate of the fuel under the non-ambient conditions; and means for adjusting the start and end points of a fuel injection event controlled by the fuel injection system on the basis of the mass-flow rate, such that a predetermined mass of fuel is injected into the one or more engine cylinders in said fuel injection event under non-ambient conditions.

18. The fuel injection control system of claim 17, wherein said means for estimating at least one physical property of the fuel under the ambient and/or the non-ambient conditions comprises a means of data comparison, the data relating to one or more of the following: fuel composition, fuel pressure, fuel temperature and speed of sound transmission; wherein said means of data comparison optionally includes one or more calibration curve, look-up table, data map, mathematical equation or other form of storing and processing data digitally.

19. The fuel injection control system of claim 17, wherein the means for estimating the mass-flow rate of the fuel comprises a means of data comparison, the data relating to one or more physical property of the fuel.

20. The fuel injection control system of claim 17, wherein the one or more physical property of the fuel include one or more of density, viscosity and isoentropic bulk modulus.

* * * * *